United States Patent [19]

Chen et al.

[11] 4,432,147

[45] Feb. 21, 1984

[54] ENERGY EFFICIENT LUMBER DRY KILN USING SOLAR COLLECTORS AND REFRIGERATION SYSTEM

[75] Inventors: Peter Y. S. Chen; Wayne A. Helmer; Howard N. Rosen, all of Carbondale, Ill.

[73] Assignee: The United States of America as represented by the Secretary of Agriculture, Washington, D.C.

[21] Appl. No.: 276,764

[22] Filed: Jun. 24, 1981

[51] Int. Cl.³ .............................................. F26B 21/08
[52] U.S. Cl. ........................................... 34/46; 34/48; 34/54; 34/93; 34/77
[58] Field of Search .................... 34/46, 48, 93, 77, 54; 126/427

[56] References Cited

U.S. PATENT DOCUMENTS

| | | | |
|---|---|---|---|
| 3,940,860 | 3/1976 | Unterreiner | 34/46 |
| 3,965,696 | 6/1976 | Thomason | 34/93 |
| 4,205,456 | 6/1980 | Ayers et al. | 34/77 |
| 4,250,629 | 2/1981 | Lewis | 34/46 |
| 4,291,833 | 9/1981 | Franchina | 126/427 |
| 4,325,357 | 4/1982 | Wormser | 126/427 |
| 4,336,692 | 6/1982 | Ecker et al. | 126/427 |

Primary Examiner—Larry I. Schwartz

Attorney, Agent, or Firm—M. Howard Silverstein; David G. McConnell

[57] ABSTRACT

Method and apparatus to control temperature and humidity in drying a material, for example green lumber, including a chamber to receive the lumber in stacked relation with air flow space between individual lumber pieces, a refrigeration system having a refrigerant compressor, evaporator and condenser where the condenser is disposed within the chamber, blower means to circulate air from the condenser over and through a stack of lumber, conduit means to communicate with the chamber for emission of air passing over the stack of lumber where the evaporator means is disposed to selectively receive the air flowing to the first conduit, solar cell means to receive radiant heat and having an inlet communicating with the first conduit and an outlet communicating with the chamber, third chamber means communicating with the first conduit and the chamber, damper means to selectively proportion air from the first conduit to the second and third conduits, controller means responsive to the temperature of the chamber to operate the damper to select the portions of the air stream from the first conduit supplied to the second and third conduits and for means to supply air from the chamber to the first conduit.

13 Claims, 5 Drawing Figures

ENERGY EFFICIENT LUMBER DRY KILN USING SOLAR COLLECTORS AND REFRIGERATION SYSTEM

BACKGROUND OF THE INVENTION

This invention relates to the kiln drying and seasoning of lumber.

Generally in the kiln drying process for lumber, hot air is blown across sawn unseasoned lumber to remove water. The lumber is arranged in stacks with small spacers, commonly referred to as stickers, between each layer so that the hot air is distributed across the faces of the lumber. After passing through the stack of lumber, the hot humid air is either partially vented, or dehumidified, to remove the water vapor before being reheated and recycled through the stacked lumber.

Those skilled in the art will recognize two basic prior art methods of kiln drying, distinguished by the method used for heating and removing of water vapor.

In the first prior art method, standard kiln drying, heat is supplied to the kiln directly, by burning of fossil fuel or indirectly, with steam passing through heat exchangers associated with the kiln. Water vapor is removed from the kiln by venting a portion of the recycled humid air to the atmosphere. Standard kiln drying is energy intensive in that it requires from 2,000 to 5,000 BTU per pound of water evaporated from the wood depending upon kiln construction, wood type, and drying schedule. Additionally, steam spray is required for stress relief of lumber at the end of drying and adds considerably to the energy requirements of the kiln.

In the second prior art method, dehumidification kiln drying, heat is electrically supplied to the kiln initially by a resistance heater and then with a compressor. Water vapor is condensed and removed from the kiln as water. Dehumidification drying has many drawbacks: (1) the drying process is slow taking twice as long as standard kiln drying; (2) the kiln operates at temperatures below 120° F. because of limitations in the dehumidification equipment; (3) drying rates below 10% moisture content are extremely slow and moisture contents of 6% required for furniture-grade lumber cannot normally be achieved; and (4) no capabilities for a humidification period following drying of the lumber required to relieve internal stresses which remain in the lumber are available.

The prior art also includes U.S. Pat. No. 3,965,696—Thomason; showing a crop drying apparatus using a heat pump to produce hot or cold drying air. The reference provides supplementary heat from a solar heat collector used in conjunction with heat obtained from the heat pump. Thomason, however, does no contemplate the disposition of both the condenser and evaporator coils within a single drying building to both produce heat and dehumidify the air passed over the material to be dried, or channels which can be relatively closed off to use the refrigeration system as a heat pump or dehumidifier in various stages.

U.S. Pat. No. 4,205,456—Ayers, et al; shows a heat pump arrangement for drying material in which air is heated as it passes through the material to be dried and is channeled through an evaporator for removing moisture therefrom.

U.S. Pat. No. 3,922,798—McMillan shows a drying apparatus wherein a refrigeration system is wholly contained within the apparatus and the heating for the apparatus is provided via the condenser with moisture removal being provided via the evaporator.

U.S. Pat. No. 3,931,683—Crites et al., shows a drier for material wherein air is passed through both a condenser and the evaporator of a refrigerant system. The condenser is disposed in a material to be dried so as to heat the material as air is passed there through. The heated, moisture-laden air is then passed through the evaporator to remove the moisture therefrom.

U.S. Pat. No. 3,762,065 I issued Oct. 2, 1973 to Wahlgren is cited to show another apparatus for drying materials wherein the condenser of a refrigeration system is used for heating air to be passed through the material to be dried. The evaporator of the refrigeration is used for dehumidifying the air after it has passed through the material.

SUMMARY OF THE INVENTION

The benefits and advantages of the present invention are achieved by an apparatus in which green or partially air-dried lumber is dried by air which circulates around a closed circuit. The air is heated by solar collectors and then by a condenser of a refrigeration system, passed in contact with the surfaces of the lumber to be dried, and dehumidified by cooling across the evaporator of the refrigeration system before being reheated to start another cycle. Based on ambient conditions and moisture content of the lumber, the solar collector can be bypassed or the refrigeration system inactivated for optimal energy efficiency of the kiln. When desired, the kiln can be humidified to relieve stresses in the lumber by spraying atomized water into the heated recycled air as it comes out of the solar collectors. When humidifying the kiln, the refrigeration system is deactivated.

An alternative embodiment of the apparatus permits the refrigeration system to serve as a heat pump as well as a dehumidifier. This embodiment is particularly useful for energy conservation when heating the kiln to operating temperature.

Additional features and advantages of the invention will become apparent from the following description, with reference to the accompanying drawings, which is presented purely as a non-limiting example.

DETAILED DESCRIPTION OF THE DRAWINGS

Figure 1:
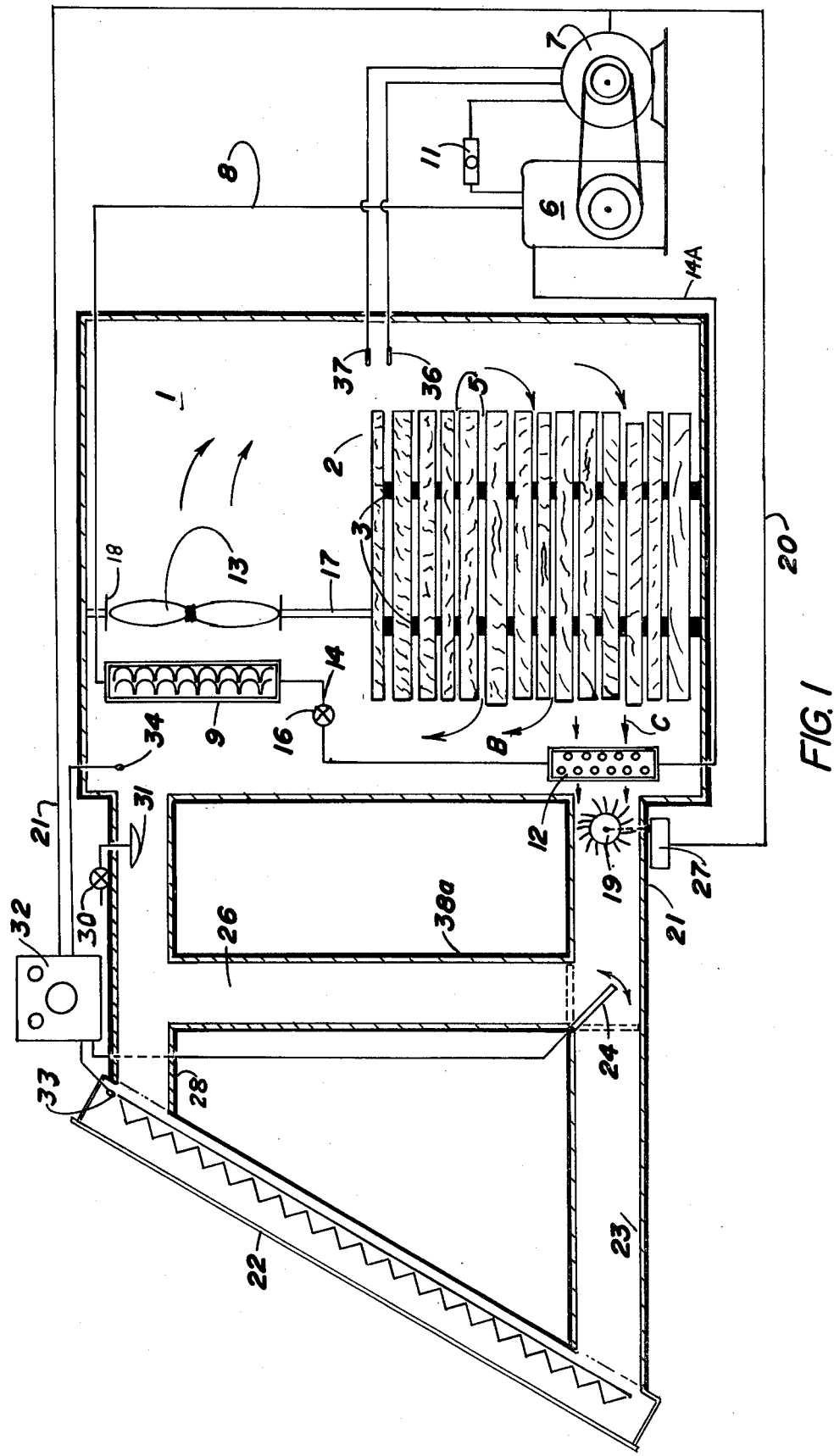
FIG. 1 is a diagramatic sketch of the energy efficient lumber drying kiln using solar collectors and a refrigeration system.

Referring to FIG. 1, an insulated drying chamber 1 is provided to receive a stack of lumber 2 with stickers 3 placed between each layer to allow air flow across the surfaces of the lumber through spaces 5 provided between the layers. A refrigeration system, for example using R-114 refrigerant or a similar one capable of transferring heat at temperatures from approximately 50° to 200° F. is provided and includes a compressor 6 driven by an electric motor 7. A refrigerant discharge line 8 is provided from compressor 6 communicating with a condenser 9 located in chamber 1. An evaporator 12 is provided in chamber 1 and a refrigerant suction line 14 is provided returning to the compressor. A conduit 14A is provided from condenser 9 to evaporator 12. A refrigerant temperature limit controller 11 is provided at compressor 6 to shut off the system if the refrigerant goes above or below preset temperature limits. A control valve 16 is provided to provide the proper superheat temperature to the refrigerant entering the compressor.

A circulating fan 13 is provided to force air to flow through the lumber stack 2, through condenser 9, and back to the fan as indicated by arrows B. To facilitate such flow a baffle 17 is provided with an opening 18 to receive fan 13 (which is driven by a motor—not shown).

In accordance with one feature of the present invention a portion of the circulating air indicated by arrow C is drawn off from the kiln through the evaporator 12 by a centrifugal blower 19 to pass through a conduit 21 to a solar collector 22 by means of an inlet duct 23.

A damper 24 is provided to control air flow to duct 23. A bypass 26 is provided at damper 24 communicating with conduit 21 so that damper 24 proportions air flow between conduits 26 and 23.

Depending on the drying schedule requirements, air is either directed to the solar collectors 22 when bypass damper 24 is in the horizontal position or through the bypass duct 26 when the damper 24 is in the vertical position. Air flowing to conduit 23 flows through solar collector outlet duct 28 to return to drying chamber 1.

A water atomizer 31 operated manually by valve 30 is located in duct 28 just before the inlet to the drying chamber 1 and is used to humidify the kiln air during selected periods required to relieve stresses in the lumber.

The bypass damper 24 is operated by a controller 32 which senses the differential temperature between the outlet of collector 22 by means of sensor 33 and the temperature inside the drying chamber 1 by means of a sensor 34. In one operation when the temperature at the outlet of the collector 22 is higher than the inside the drying chamber damper 24 moves to close bypass line 26. Alternatively when the temperature sensed by sensor 33 is lower than the temperature sensed by sensor 34 damper 24 moves to close conduit 23 so no air flows to collector 22.

The refrigerent system can be controlled by various means within the scope of the present invention but in the figures control is achieved by regulating the compressor motor 7. A humidistat controller 36 located within chamber 1 activates the compressor motor 7 if the humidity is above the preset value. A temperature sensor 37 is located in drying chamber 1 and deactivates the compressor motor 7 if the temperature in chamber 1 goes above a preset limit. A blower controller 27 is provided to supply an output 20 for compressor motor 7 and controller 32 by means of output 21 to activate centrifugal blower 19 when either the refrigeration system or the solar collector is operational. The drying chamber and all ducts are provided with insulation 38a to prevent heat loss.

Figure 2:
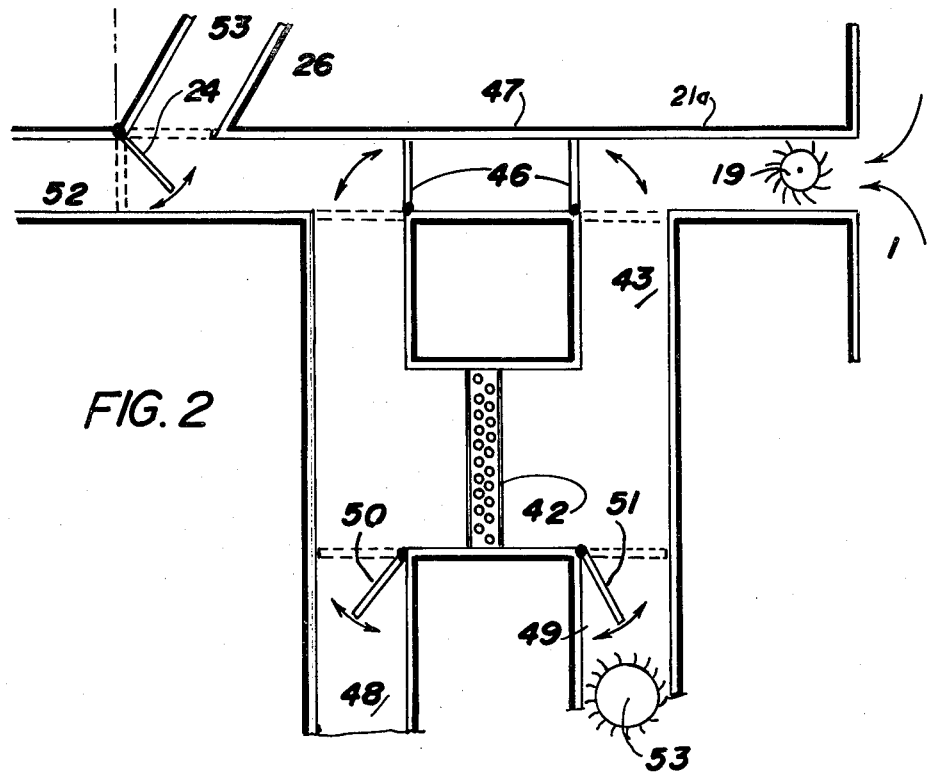
FIG. 2 is a diagram of a modification to the kiln to use the refrigeration system as a heat pump or dehumidifier, with dampers in dehumidifcation, with humidification and with the refrigeration system used as a heat pump.

FIG. 2 illustrates an alternative ducting arrangement within the scope of the present invention where the refrigeration unit is used as a dehumidifier or heat pump.

In FIG. 2, air is emitted from chamber 1, by means of blower 19 to duct 21a to a bypass duct 43 to an evaporator 42 which can be the same as evaporator 12 of FIG. 1 except that the evaporator is located outside the drying chamber. Evaporator 42 would be an element of a refrigeration system similar to that of FIG. 1. Ambient air inlet ducts 48, 49 are provided on opposite sides of evaporator 42 where a blower 53 is provided in duct 49 downstream of evaporator 42. Dampers 50 and 51 are provided in ducts 48 and 49 respectively and pivotable as shown by the directional arrows by control means (not shown) to control ambient air flow in response to selected temperature differentials as described hereinafter.

Figure 3A:
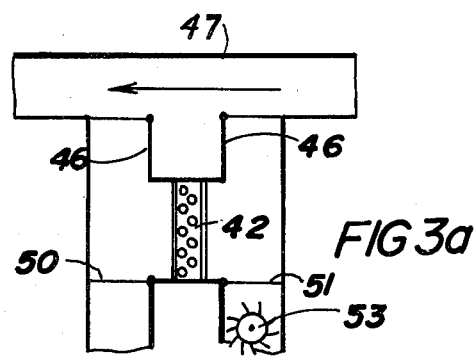
FIGS. 3a–3c illustrate the operation of the modified system described in FIG. 2.
Figure 3B:
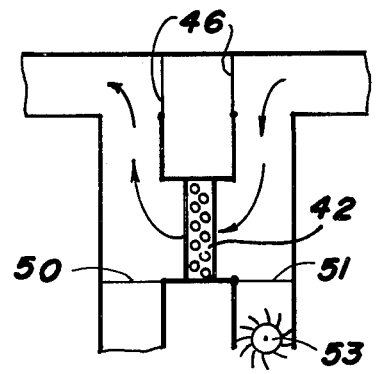
Figure 3C:
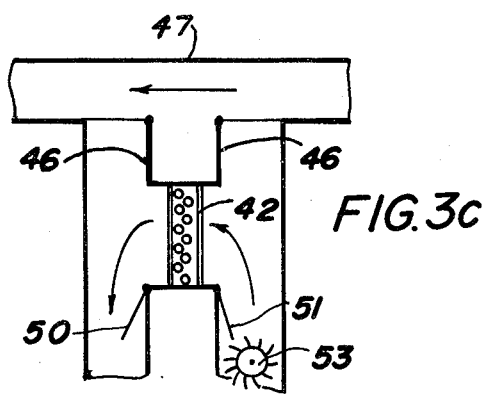

Operation of the arrangement shown in FIG. 2 is illustrated in FIGS. 3a–3c.

A bypass duct 47 is provided to allow airflow from chamber 1 to duct 52 which communicates with a solar collector similar to collector 22 of FIG. 1. Dampers 46 are provided in duct 47 and pivotable from a position to close off duct 47 as shown in FIG. 2 to a position closing off duct 43 as shown in FIGS. 3a–3c and described hereinafter.

Bypass 26 is also show in FIGS. 1 and 2 as is damper 24.

FIGS. 3a–3c show the flow of kiln and ambient air for one of the refrigeration system as a dehumidifier or heat pump.

FIG. 3a is an illustration of a mode of operation when no dehumidification is required. Dampers 46, 50 and 51 are in the horizontal position and blower 53 is off. Evaporator 42 is bypassed so, referring to FIG. 1, the air stream is directed to collector 22 or through bypass 26 as previously described. In FIG. 3b when evaporator 42 is used as a dehumidifier, dampers 46 are vertical blocking flow through duct 47 and kiln air is directed across evaporator 42. Dampers 50 and 51 are horizontal or closed, and blower 53 is off. In FIG. 3c when the refrigeration system serves as a heat pump, dampers 46 are horizontal to allow air in, dampers 50 and 51 are vertical and blower 53 circulates ambient air across to pump heat from the ambient air into the kiln by means of the refrigeration system operating as a heat pump.

In operation of the kiln, the drying chamber 1 is loaded with a stack of lumber 2. The circulation fan 13 and blower 19 are started. Damper 24 is in the horizontal position so that air is circulated through the solar collectors 22. If the alternative embodiment in FIG. 2 is employed, the dampers are set as in FIG. 3c so that the refrigeration system is used as a heat pump to rapidly heat the air until the kiln reaches 50° to 100° F. depending upon ambient conditions. The humidistat controller 36 and temperature sensor 37 are set at the initial conditions of the drying schedule, and refrigeration temperature controller 14 is set (225° F. maximum and 50° F. minimum). The lumber is dried until the moisture content reaches 20 to 25% depending upon the end use of the lumber. Moisture content can be determined by convential methods such as sample drying. If stress relief is desired the refrigeration sytem is deactivated and the atomizer 31 and heated air from the solar collectors 22 provide a high humidity in the drying chamber.

The following example is given to facilitate a more detailed and better understanding of the present invention, and is not intended to limit this invention to this example.

Five hundred board feet of yellow poplar (1 inch by 4 to 6" by 100"), 97% initial moisture content, were placed in stacks in a dryer similar to the one in FIG. 1. The refrigerant R-114 was circulated with a 1½-HP compressor through the refrigeration system which had a cooling capacity of 18,000 BTU/hr. The circulating fan forced air across the lumber at 250 fpm and the blower circulated air across the 122 square feet of solar collectors at 520 fpm. The following table shows, by way of example, the progress of a kiln from May 29 to June 9, 1980, in Carterville, Ill., 37° N latitude:

| Elapsed time (days) | Moisture content of lumber (%) | Drying chamber | |
|---|---|---|---|
| | | Maximum temp. (°F.) | Control relative humidity |
| 0 | 97 | 95 | 80 |
| 1 | 86 | 123 | 80 |
| 2 | 74 | 129 | 80 |
| 3 | 57 | 122 | 80 |
| 4 | 46 | 120 | 75 |
| 5 | 34 | 131 | 65 |
| 6 | 22 | 129 | 35 |
| 7 | 15 | 150 | 25 |
| 8 | 10 | 160 | 25 |
| 9 | 7 | 167 | 25 |
| 10 | 6 | 187 | 75 |
| 11 | 7 | 194 | 75 |

Compared to conventionally kiln-dried lumber, the quality of the lumber dried by this invention was lighter and has less end and surface checks than conventionally dried lumber. Energy requirements for the kiln in this disclosure required 50%, less energy to remove the same amount of water than a conventional kiln of similar size and drying a similar type of wood.

The invention claimed is:

1. Apparatus to control temperature and humidity in drying selected material, including a chamber to receive the material to be dried, a refrigeration system having a refrigerant compressor, evaporator means and a condenser where the condenser is disposed within the chamber, blower means to circulate air from the condenser over and through the material to be dried, first conduit means communicating with the chamber and providing a flow path for a portion of the air passing over the material to be dried where the evaporator means is disposed to receive at least a portion of the air flowing through the first conduit, solar cell means to receive radiant heat and having an inlet communicating with the first conduit and an outlet communicating with the chamber, a duct directly connecting the chamber to the outlet of the solar cell means to convey heated air from the solar cell means directly to the chamber, second conduit means having an inlet communicating with the first conduit and an outlet communicating with the chamber, damper means downstream from said evaporator means to selectively direct air flowing from the first conduit to the second conduit and to the solar cell means, and fan means to supply air from the chamber to the first conduit.

2. The invention of claim 1 wherein the evaporator means is disposed within said chamber adjacent the inlet to said first conduit.

3. The invention of claim 1 including controller means including sensor means to sense the temperature of air passing through said solar collector to said chamber, said controller being coupled to said damper to move said damper means to a first position to direct air through said inlet conduit and through said solar collector when the sensed temperature of the air in said solar collector is in excess of the temperature in said chamber and to a second position to direct air through said second conduit when the sensed temperature of the air in said solar controller is lower than the temperature of said in said chamber.

4. The invention of claim 1 including humidity sensor means located within said chamber to initiate operation of said refrigerant compressor when the sensed humidity of the air in said chamber is at a preselected level, and temperature sensor means located to sense the temperature of air in said chamber to terminate operation of said refrigerant compressor at selected temperatures.

5. The invention of claim 1 including fan control means responsive to temperature of air in said solar collector to the operate said fan means when the temperature of air in said solar collector is in excess of a selected temperature.

6. The invention of claim 1 including fan control means to operate said fan either when said compressor is activated or when said damper means is positioned to permit air to flow from said chamber through said solar cell means.

7. The invention of claim 1 including by-pass conduit means having inlet and outlet means communicating with said first conduit, by-pass conduit damper means located in said first conduit between said fourth conduit inlet and outlet means and operable between a first position to direct a flow of air from said first conduit through said by-pass conduit and back to said first conduit and a second position to substantially prevent air from flowing through said by-pass conduit, and wherein said refrigerant evaporator means is located in said by-pass conduit.

8. The invention of claim 7 including ambient air inlet means to said by-pass conduit on an upstream side of said evaporator and ambient air outlet means in said by-pass conduit on a downstream side of said evaporator and first and second ambient air damper means selectively operable between an open position to allow a flow of ambient air to said by-pass conduit and a closed position to preclude admission of ambient air to said by-pass conduit and ambient air fan means to selectively supply ambient air to said ambient air inlet means.

9. The invention of claim 8 including humidity sensing means in said chamber and damper control means to position said by-pass conduit damper means in said first position when the humidity in said chamber is in a first selected range and to position said by-pass conduit damper means in said second position when the humidity in said chamber is in a second selected range to provide an air flow through said by-pass conduit and said evaporator for dehumidification of said air.

10. The invention of claim 8 including mode selection control means responsive to a selected temperature and humidity in said chamber and to a selected temperature in said solar collector to operate said by-pass conduit damper means to said second position whereby said refrigeration system operates as a heat pump to provide heat to said chamber.

11. The invention of claim 1 including atomizer means positioned in the air flow path between said second conduit outlet and said chamber entrance, and atomizer valve means selectively operable between an open position, to humidify returning kiln air, and a closed position; wherein said compressor is disengaged while the atomizer valve means is in the open position.

12. The invention of claim 1, wherein said refrigerant system is capable of transferring heat at temperatures within the range of approximately 50° F. to approximately 200° F.

13. The invention of claim 4 including fan control means to operate said fan either when said compressor is activated or when said damper means is positioned to permit air to flow from said chamber through said solar cell means.

* * * * *